United States Patent [19]

Cook, II

[11] 4,180,753

[45] Dec. 25, 1979

[54] APPARATUS FOR GENERATING ELECTRICALLY DISTINGUISHABLE BIPOLAR SIGNALS USING A MAGNETIC SENSOR AND AN OVAL WHEEL WITH TEETH AND NOTCHES IN ITS MINOR AND MAJOR AXIS

[75] Inventor: James C. Cook, II, Lincoln Park, Mich.

[73] Assignee: Ford Motor Company, Dearborn, Mich.

[21] Appl. No.: 920,762

[22] Filed: Jun. 30, 1978

[51] Int. Cl.² .............................................. H02K 21/26
[52] U.S. Cl. ..................................... 310/168; 310/155; 324/208; 324/174; 340/347 P; 123/146.5 A; 123/148 E
[58] Field of Search .................... 324/16 T, 166, 173, 324/174, 178, 179, 208; 340/347 P; 310/168, 155, 111, DIG. 3; 123/148 E, 146.5 A

[56] References Cited

U.S. PATENT DOCUMENTS

| | | | |
|---|---|---|---|
| 2,070,623 | 2/1937 | Satterlee | 324/167 X |
| 2,325,927 | 8/1943 | Wilbur | 324/173 X |
| 3,156,115 | 10/1964 | Adelmann | 73/198 |
| 3,501,664 | 3/1970 | Veillette | 318/138 |
| 3,597,687 | 8/1971 | Seipp | 324/173 |
| 3,721,968 | 3/1973 | Gee | 324/173 |
| 3,930,201 | 12/1975 | Achermann et al. | 324/208 |
| 4,001,678 | 1/1977 | Sorkin et al. | 324/173 |
| 4,072,893 | 2/1978 | Huwler | 340/347 P |
| 4,095,179 | 6/1978 | Bremer et al. | 324/207 |

Primary Examiner—Robert J. Corcoran
Assistant Examiner—Walter E. Snow
Attorney, Agent, or Firm—Peter Abolins; Clifford L. Sadler

[57] ABSTRACT

This specification discloses an apparatus and method for providing electrically distinguishable signals occurring as a function of the position of a moving element. It is possible to identify a sub group of electrical signals from the remaining electrical signals or from the entire group. The electrical signals can be used altogether to determine a variable such as revolutions per minute of the movable element or, particular ones of the electrically distinguishable signals can be used for initiating a function such as the firing of spark plugs.

6 Claims, 4 Drawing Figures

APPARATUS FOR GENERATING ELECTRICALLY DISTINGUISHABLE BIPOLAR SIGNALS USING A MAGNETIC SENSOR AND AN OVAL WHEEL WITH TEETH AND NOTCHES IN ITS MINOR AND MAJOR AXIS

FIELD OF THE INVENTION

This invention relates to an apparatus and method for generating pulses and, in particular, generating pulses indicating the rotational movement and position of a shaft.

DESCRIPTION OF THE PRIOR ART

It is known in automotive vehicles to have a rotating wheel provide signals representative of the rotation of a crank shaft of an engine. In particular, the wheel can have a number of radially protruding teeth which produce a signal each time they go past the receiver. Thus, determining the number of teeth which pass the detector during a given time period can be used to determine the revolutions per minute of the crank shaft. Further, the occurrrence of a pulse generated by a tooth indicates that the rotational position of the wheel, and thus the crank shaft, is at one of those positions indicated by the teeth on the wheel.

Signals can also be generated which characterize one particular angular reference position of the crank shaft. Such signals are necessary, for example, to initiate ignition. Although each one of the teeth on the wheel may indicate that an ignition should take place, the reference position is necessary to indicate when the sequence of cylinder firing should start. To generate a reference signal, it is known to make use of an additional wheel having a single protruding tooth and an additional detecting device for detecting the single tooth. Thus, a signal indicating a particular reference position occurs when the receiver detects passing of the single tooth. Such an arrangement is undesirable because there is the additional expense of the wheel having a single tooth and the detector as well as the assembly of the two additional components. The positioning of the wheel with the single tooth with respect to the other wheel must be done carefully so that there is an accurate angular relationship between the two wheels.

The prior art also teaches attempts at avoiding the necessity for two separate wheels and the attendant disadvantages. In a wheel having a plurality of teeth, one tooth is longitudinally cut to provide two tooth portions with a gap therebetween. If the spacing between adjacent uncut teeth is equal to the width of a tooth, the presence of the cut tooth with the gap can be detected by comparing the duration of the separation between adjacent teeth and the width of the immediately proceeding tooth. That is, the spacing separating a cut tooth and an adjacent tooth is greater than the width of one of the cut tooth portions.

However, such a scheme also has disadvantages in that the width of a tooth must be sufficiently wide to be cut into two portions and still provide a signal. Thus, the minimum width of the tooth is determined by the ability of a manufacturing process to form two tooth portions out of a single tooth. Further, the counting technique used to determine the presence of a cut tooth is based upon a spacing between adjacent teeth equal to the width of each tooth. Thus, such a system may not be desirable where it is necessary to have relatively narrow pulses which are spaced further apart than the pulse width. Further, relatively elaborate circuitry is required to determine the occurrence of a split tooth. Still further, it would be desirable to be able to establish the position of the reference point without the need for detecting or recognizing any of the other positions denoting angular position.

A further problem which has existed without a completely satisfactory solution is to provide a sufficiently accurate indication of revolutions per minute when only two angular positions of the wheel need be known to determine firing of the cylinders. For example, in a four cylinder engine, two cylinders are fired during each rotation of the wheel. Thus, although only two positions are required on the wheel, the variance when determining the revolutions per minute is sufficient that it is desirable to have additional reference positions on the wheel for more frequent and thus more accurate computation of crankshaft revolutions per minute. One problem has been that these additional reference positions create erroneous spark plug firings. While the signals designating the different reference positions should be different, they should be sufficiently alike in such parameters as magnitude that the apparatus used to detect one signal can easily and efficiently detect the other signal. These are some of the problems this invention overcomes.

SUMMARY OF THE INVENTION

This invention teaches a pulse generating apparatus and method for providing electrically distinguishable signals occurring as a function of position of a relatively movable element. For purposes of electrically distinguishing the signals, they need not have any particular relationship with respect to one another, can be placed in an arbitrary angular position with respect to one another and can be detected and distinguished without detection of any other signal. A particular problem which this invention solves is the use of a single wheel coupled to a rotating crankshaft for determining both the revolutions per minute of the crankshaft and determining when a cylinder should be fired. For example, two positions on a rotating wheel can be distinguished from two other positions on a rotating wheel.

More specifically, the pulse generating means includes a transducer means located on the relatively movable element for generating the electrically distinguishable signals. A transducer receiving means is located in energy transfer coupling with respect to the transducer means for providing the electrically distinguishable signals in response to passage of the transducer means past the transducer receiving means. The transducer means includes teeth means for projecting toward the transducer receiving means for generating electrical signal of a first shape and a notch means for receding away from the transducer receiving means for generating an electrical signal of a second shape, distinguishable from the first shape.

DETAILED DESCRIPTION OF THE PREFERRED EMBODIMENT

Figure 1:
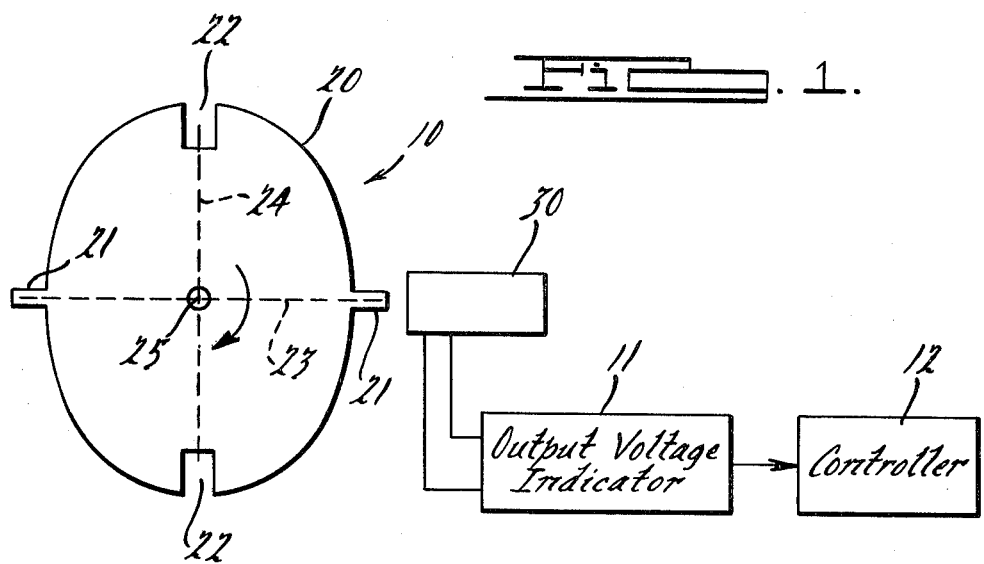
FIG. 1 is a schematic representation of a pulse generating circuit in accordance with an embodiment of this invention.

Referring to FIG. 1, a pulse generator 10 includes a transducer wheel 20 operatively coupled by a magnetic field to a transducer receiver 30 which is electrically connected to the combination of an output voltage indicator 11 and a controller 12. Rotation of transducer wheel 20 produces a changing magnetic flux which is detected by transducer receiver 30 and communicated as a voltage to output voltage indicator 11 where the voltages are displayed. Controller 12 performs various functions in response to the signals indicated at output voltage indicator 11. For example, such functions can include computation of revolutions per minute of an engine crankshaft and initiating firing of a cylinder spark plug in an automobile engine.

Transducer wheel 20 has a generally elliptical shape with a pair of teeth 21 protruding from the periphery of the generally elliptical shape along a minor diameter 23 and a pair of notches 22 extending into the generally elliptical shape along a major diameter 24. Transducer wheel 20 rotates about a central axis 25 so that teeth 21 and notches 22 pass transducer receiver 30. Transducer wheel 20 is made of a ferro magnetic material so that it can influence a magnetic field established by transducer receiver 30.

More particularly, it is generally desirable to have the magnitude of the field influence be the same when a tooth 21 passes transducer receiver 30 as when a notch 22 passes transducer receiver 30. This invention recognizes that a circular periphery having a notched indentation and a tooth extending down the circular boundary and rotating about a fixed axis would position the tooth closer to transducer receiver 30 than the notch. As a result, the effect produced by the tooth would be greater than that produced by the notch. In accordance with an embodiment of this invention, transducer wheel 20 is shaped so that notches 22 and teeth 21 pass approximately the same distance from transducer receiver 30 and produce an effect of substantially equal magnitude, even though of opposite polarity, on the magnetic flux. Thus, the particular relationship of the width of the tooth and the width of the notch depends, in part, on the magnetic properties of the material which forms the tooth in relation to the magnetic properties of the material which forms the notch.

Teeth 21 are generally rectangular in shape and have an axis aligned with the radius of transducer wheel 20. Similarly, notches 22 are also rectangular in shape and have an axis along the radius of transducer wheel 20. In order to make the increase in flux when a tooth 21 passes transducer receiver 30 substantially equal to the reduction in magnetic flux when notch 22 passes transducer receiver 30, it has been found that the width of notch is advantageously about $2\frac{1}{2}$ times the width of a tooth 21 and that notch 22 extends longer in a radial direction than a tooth 21. The curve of the periphery of transducer wheel 20 between a tooth 21 and adjacent notch 22 is curved so that as transducer wheel rotates, the change in magnetic flux adjacent transducer receiver 30 is substantially constant thereby producing a substantially constant output voltage. Accordingly, since the periphery of transducer wheel 20 adjacent wheel 21 is further from transducer receiver 30 than the portion of periphery of transducer wheel 20 adjacent notch 22, the rate of change of curvature adjacent to tooth 21 is greater than the rate of change of curvature adjacent notch 22. Additionally, the curvature between tooth 21 and adjacent notch 22 is advantageously smooth and without sudden changes in curvature which would cause abrupt fluctuations in the output voltage.

Transducer receiver 30 detects the change in magnetic flux and has an electrical voltage output indicative of the rate of change of flux. More particularly, referring to FIG. 3, a reluctance type pickup measures the rate of change of flux and includes a permanent magnet 31, a pole piece 32 positioned adjacent permanent magnet 31 and a wire coil 33 wound around pole piece 32. Changing magnetic flux in pole piece 32 induces a voltage in wire coil 33 and produces an electrical input for output voltage indicator 11.

Figures 3, 4:
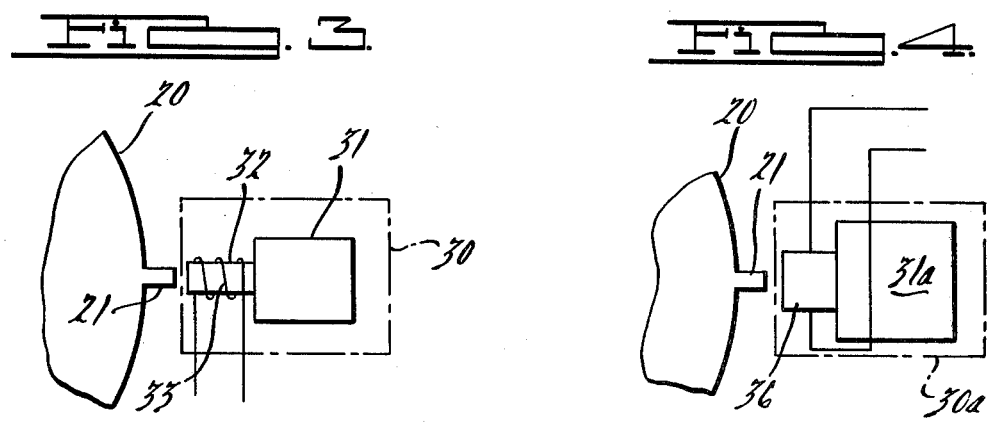
FIG. 3 is an enlarged portion of an embodiment of this invention when a coil pickup is used.
FIG. 4 is an enlarged portion of an embodiment of this invention wherein a Hall effect semiconductor is used.

Referring to FIG. 4, a transducer receiver 30a includes a permanent magnet 31a adjacent a semiconductor 36 which is fabricated so that magnetic flux adjacent semiconductor 36 causes a Hall effect and a shift of charge carriers within semiconductor 36 can be used to establish a voltage proportional to the flux. That is, in the Hall effect device of transducer receiver 30a the output voltage is proportional to the magnitude of the magnetic field. In contrast, in transducer receiver 30 shown in FIG. 3, the output voltage is a function of the rate of change of the magnetic flux. The transducer wheel used with either of the two transducer receivers can be the same.

Figure 2:
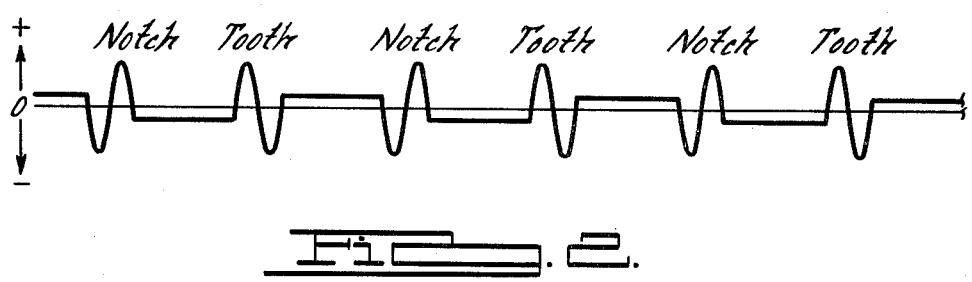
FIG. 2 is a wave form diagram of the signal generated by the embodiment of this invention shown in FIG. 1.

Referring to FIG. 2, the output of a device in accordance with FIG. 3 is shown. As can be seen from the wave form, the magnitude of the electrical signals in response to a passing of a tooth 21 and a notch 22 adjacent transducer receiver 30 alternate in sequence and are approximately equal in magnitude. However, the polarities are reversed with a tooth having a positive rise followed by a negative drop and a notch 22 having a negative drop followed by a positive rise. The magnitude of the signal going from a tooth 21 to a notch 22 is a small positive value because of the increasing amount of magnetic flux caused by an increased mass of transducer wheel 20 adjacent transducer receiver 30. The opposite occurs when going from a notch 22 to a tooth 21. There is a decrease in magnetic flux and thus there is a small constant negative signal between the electrical signals caused by the decreasing diameters of transducer wheel 20 in the direction from notch 22 to tooth 21.

Referring again to FIG. 1, controller 12 performs various functions in response to the electrical signals shown in the wave form of FIG. 2. For example, controller 12 can cause the firing of a spark plug in a cylinder of an automotive engine when the electrical signal in response to a tooth 21 has a zero crossing. The occurrence of such a zero crossing typically would be set to occur 10° before top dead center of the piston associated with the spark plug to be fired. Additionally, controller 12 can compute the revolutions per minute by determining the number of zero crossings, both from teeth 21 and notches 22, during a given period of time.

The availability of a differentiation between the electrical signals produced by the notches 22 and teeth 21 permits controller 12 to readily decide whether a spark plug should be fired. Nevertheless, the availability of electrical signals from notch 22, even though not used for firing of a cylinder, in addition to electrical signals produced by teeth 21, increases the accuracy of the revolution per minute computation. Further, the fact that the magnitude of the signals from both teeth 21 and notches 22 can be substantially equal, simplifies the circuitry of controller 12 and permits it to handle both signals with equal ease. If one signal were substantially different from the other, the smaller signal would have a substantially worse signal to noise ratio compared to the other signal. This is particularly important when pulse generator 10, exists in an electrically noisy environment such as an automobile.

Experimental data indicates that transducer wheel 20 can be an ellipse and that the particular shape of transducer wheel 20, notches 22 and teeth 21 can depend upon the spacing of transducer receiver 20 the axis of rotation of transducer wheel 20. Typical parameters for pulse generator 10 include a tooth 21 having a width of 0.120 inches and a radial extension of 0.125 inches. Typical dimensions for notch 22 includes a width of 0.30 inches and a radial depth of 0.35 inches. The thickness of transducer wheel 20 can be about 0.20 inches and have a radius which corresponds to the following table wherein a tooth 21 is positioned 90° from a notch 22 which forms a reference position for angle, $\theta$, so that angle $\theta$ has a value of zero at notch 22 and a value of 90° at tooth 21. The magnitude of the radius at 0° includes the radial indentation of notch 22, and the magnitude of the radius at 90° includes the radial extension of tooth 21.

| $\theta$ (in degrees) | r (in inches) |
|---|---|
| 0 | 2.110 |
| 10 | 2.105 |
| 20 | 2.099 |
| 30 | 2.092 |
| 40 | 2.083 |
| 50 | 2.072 |
| 60 | 2.059 |
| 70 | 2.041 |
| 80 | 2.017 |
| 90 | 1.985 + .125 = 2.110 |

A typical transducer receiver can be a magnet made of alnico V having a generally cylindrical shape with a length of 1.0 inches and a diameter of 0.31 inches. A generally cylindrical piece of soft iron abuts an end face of alnico magnet, is coaxial therewith, has a length of about 0.25 inches, a diameter of 0.156 inches, and has wound therearound about 3100 turns of wire.

Various modifications and variations will no doubt occur to those skilled in the art. For example, the particular shape of the teeth and notches may be varied from those disclosed herein. These and all other variations which basically rely on the teachings through which this disclosure has advanced the art are properly considered within the scope of this invention.

I claim:

1. Pulse generating means for providing electrically distinguishable signals, said signals occurring as a function of position of a relatively movable element, said pulse generating means comprising:
    a transducer means located on said relatively movable element for generating the electrically distinguishable signals;
    a transducer receiving means located in energy transfer coupling with respect to said transducer means for providing the electrically distinguishable signals in response to passage of said transducer means past said transducer receiving means;
    said transducer means including teeth means for projecting toward said transducer receiving means for generating an electrical signal of a first shape and notch means for receding away from said transducer receiving means for generating an electrical signal of a second shape, distinguishable from said first shape, each of said teeth means and notch means being sufficiently sized to be detected by said transducer receiving means;
    said transducer means including a generally oval disc of a magnetic material having a major and a minor diameter, said projections for said teeth means extending outward from said disc along said minor diameter, said notch for said notch means extending radially inward along said major diameter, said notch and said projection having a generally rectangular shape and the periphery of said oval between an adjacent pair of notch means and teeth means being a continuous curve; and including two teeth, one tooth being opposite from the other, and further including two notches, one notch being opposite from the other notch and each notch being positioned midway around the circumference of said oval between said two teeth; and
    said transducer receiving means including a permanent magnet, an electrical pickup means coupled to said magnet for detecting changes in the magnetic flux, and said magnet being sufficiently close to a path of rotation for said teeth means and said notch means that movement of said teeth means and said notch means past said transducer receiver means causes a change of magnetic flux within pickup means 2. Pulse generating means as recited in claim 1 wherein said electrical pickup means includes a Hall effect device means for detecting magnetic flux, said Hall effect device including semiconductor means providing an electrical charge displacement in response to a magnetic field, and voltage measuring means for sensing the electric charge displacement within said semiconductor means.

3. Pulse generating means for providing electrically distinguishable signals of substantially equal magnitude comprising:
    a rotating, generally oval ferro magnetic material, distinguishable signals occurring as a function of rotational position of said member, said member including a pair of opposing teeth extending outwardly from the generally oval shape of said member along the minor diameter of said member for rotating and aiding in the generation of a first signal shape, and said member including a pair of opposing notches extending inwardly from the generally oval shape of said member along the major diameter of said member for rotating and aiding in the generation of a second signal shape; and
    a transducer receiving means located in energy transfer coupling with respect to said ferro magnetic material member, including a permanent magnet, a pole piece magnetically coupled to said permanent magnet, and an electrical wire coil coupled to said pole piece for detecting changes in the magnetic flux within said pole piece, and said pole piece being sufficiently close to a path of rotation for said teeth and notches past said pole piece so there is caused a change of magnetic flux within said pole piece and so that there is an induced current corresponding to said first signal shape when a tooth passes said pole piece and corresponding to said second signal shape when a notch passes said pole piece, said first and second signals being inverse of one another, and having a substantially equal magnitude.

4. Pulse generating means as recited in claim 3 wherein the diameter of said magnetic member is changing in magnitude between an adjacent tooth and notch, the curvature of the perimeter of said magnetic member being such as to provide a constant voltage output when the changing magnetic flux is detected by said transducer receiving means.

5. A method of generating electrically distinguishable signals of substantially equal magnitude, including the step of:
   rotating a magnetic transducer having a generally oval shape;
   positioning a pole piece of a permanent magnet near the transducer to provide a flux source for interaction with the transducer;
   varying the magnetic reluctance of a flux path adjacent the flux source in a first direction by rotational movement of a protrusion extending from the minor diameter of the transducer, and varying the magnetic reluctance of a flux path in a second direction by rotational movement of a notch extending into the periphery of the transducer along the major diameter;
   detecting changes in magnetic flux through the pole piece by measuring the current flow through a coil or wire around the pole piece;
   adjusting the relative size and position of the magnetic transducer to the pole piece by changing the size, height and depth of the protrusion and notch so that the magnitudes of current flow in response to a protrusion the and a notch are substantially equal; and
   distinguishing the passage of a protrusion the pole piece from the passage of a notch by the pole piece by analyzing the polarity of change of the current in the coil of wire.

6. A method as recited in Claim 5 wherein the step of generating a flux includes the steps of:
   sequentially passing the periphery of the transducer associated with a decreasing diameter past the pole piece, passing a protrusion extending from the oval transducer past the pole piece, passing the periphery of the transducer associated with an increasing diameter past the pole piece thereby generating a flux change in the first direction; and
   sequentially passing the periphery of the transducer associated with an increasing diameter past the pole piece, passing an notch in the periphery of the oval transducer past the pole piece, and passing the periphery of the transducer associated with a decreasing diameter past the pole piece thereby generating a flux change in the second direction.

* * * * *